United States Patent [19]

Keeney, Jr.

[11] 4,403,268
[45] Sep. 6, 1983

[54] PROTECTIVE RELAY HAVING AN IMPROVED CHARACTERISTIC ANGLE ADJUSTMENT CIRCUIT

[75] Inventor: Marvin F. Keeney, Jr., Springfield, Pa.

[73] Assignee: General Electric Company, Philadelphia, Pa.

[21] Appl. No.: 343,616

[22] Filed: Jan. 28, 1982

[51] Int. Cl.³ ............................................ H02H 3/00
[52] U.S. Cl. ....................................... 361/80; 361/82
[58] Field of Search ................................... 361/80–84, 361/87

[56] References Cited

U.S. PATENT DOCUMENTS 4,161,011 7/1979 Wilkinson ............................. 361/80

Primary Examiner—Harry E. Moose, Jr.
Attorney, Agent, or Firm—John P. McMahon; William Freedman

[57] ABSTRACT

A protective relay having means for adjusting a plurality of characteristic angles is disclosed. A characteristic angle is preselected to correspond to a desired reach representative of one or more zones of an A.C. high voltage transmission line desired to be protected. The adjustable characteristic angle means is interconnected to each of the one or more phases of the A.C. transmission line by a cascaded arrangement of one or more transactors and clamping means. The adjustable characteristic angle means comprises an operational amplifier, a plurality of resistors, a capacitor and selectable means for interconnecting each of the plurality of resistors one at a time to the operational amplifier. The plurality of resistors have values to correspond to the desired characteristic angles of the protective relay. The operational amplifier in combination with the plurality of resistors and the capacitor develop an output signal having a substantially constant magnitude as the characteristic angle is varied.

4 Claims, 1 Drawing Figure

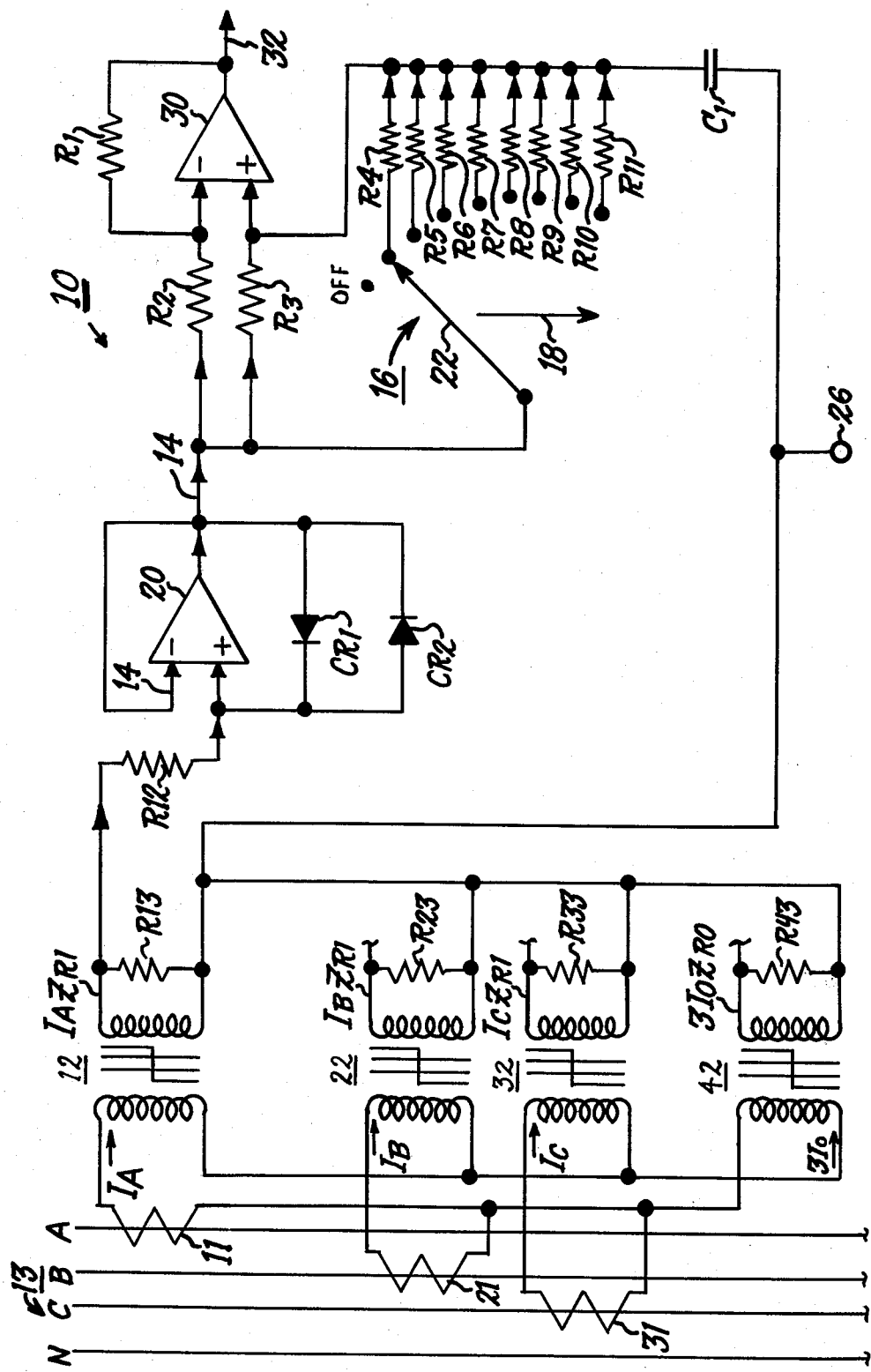

PROTECTIVE RELAY HAVING AN IMPROVED CHARACTERISTIC ANGLE ADJUSTMENT CIRCUIT

BACKGROUND OF THE INVENTION

This invention relates to a protective relay used in a system for protecting one or more zones of an A.C. high voltage transmission line, and more particularly, to a circuit for a protective relay to develop a plurality of characteristic angles.

Protective relays are typically situated at a particular location along an A.C. high voltage transmission line for the protection of portions or zones along the transmission line. Protective relays frequently employ a phase comparator method of measurement to provide protection for zones of the transmission line. One such protective relay is described in U.S. Pat. No. 4,161,011 of S. B. Wilkinson. Another such protective relay is described in U.S. patent application of L. P. Cavero, Ser. No. 309,549 filed Oct. 7, 1981. This patent and the patent application are both assigned to the same assignee of the present invention and are herein incorporated by reference.

The protective relay typically has parameters related to the protected zones and to the transmission line. For example, the protective relays have a "forward reach" parameter, a "reverse reach" parameter, and a characteristic angle parameter. The forward reach is the distance in a forward direction, relative to the location of the protective relay, for which the relay is desired to detect and respond to faults along the transmission line. The reverse reach is similar to the forward reach but in the opposite direction along the transmission line. The forward and reverse reach parameters are typically selected to conform to the distances or zones of the transmission line. The reach of a protective relay related to the phases A and B of the transmission line may typically be determined by the expression $Z_{L1AB} = V_{AB}/(I_A - I_B)$, where the subscripts A and B are related to the phases A and B of the transmission line. The quantity $Z_{L1AB}$ is the positive sequence impedance of the transmission line related to phases A and B between the location of the protective relay and the boundary of the zone along the transmission line desired to be protected. The protective relay frequently in determining a fault condition related to phases A and B, through appropriate coupling devices, compares the potential ($V_{AB}$) between the phases A and B with the vectorial difference ($I_A - I_B$) of the phases A and B currents. The quantity $V_{AB}$ coupled to the protective relay is typically termed the restraint signal. The signals representative of the $I_A$ and $I_B$ are typically coupled to the protective relay and combined with a $Z_{R1}$ quantity, which is the positive sequence impedance of the protective relay itself, to form the quantity $(I_A - I_B) Z_{R1}$, which, in turn, is commonly termed one of the operate signals of the relay.

The characteristic angle parameter of the protective relay is typically selected to correspond to the characteristic angle parameter of the protected zone relative to the impedance angle of the transmission line.

For example, for a transmission line of a 60 Hz system the impedance angle may have a range of 45°–85°. The impedance angle is dependent upon the resistive, capacitive and inductive parameters of the transmission line. The impedance angle, is the angle by which the current flowing in the transmission lags the voltage drop across the transmission line. The characteristic angle of the relay is typically selected to be approximately equal to the impedance angle of the transmission line. For example, if the impedance angle of the transmission line is 82°, the characteristic angle of the protective relay may be set to 80°. The term "angle of maximum reach" of the protective relay is commonly used in an interchangeable manner with the characteristic angle. It is desirable that the characteristic angle parameter of the protective relay be easily adjusted or adapted so as to allow the protective relay to match the impedance angle of the protected transmission line as closely as practical in order to provide optimum protection.

The characteristic angle of the protective relay may typically be developed from a signal IZ coupled from the transmission line to the protective relay. The characteristic angle may be selected by adjusting the transfer impedance angle of a coupling device, such as a transactor, coupled to one of the phases of the phases of the A.C. transmission line so as to sense the current (I) flowing within the coupled phase. The transactor develops the signal IZ, where Z is the transfer impedance of the transactor having a transfer impedance angle $\theta$. If the transactor is coupled to phase A of the transmission line the signal IZ may be expressed as $I_A Z_{R1}$ which is one component of the operate signal $(I_A - I_B) Z_{R1}$ and whose magnitude also affects the reach of the protective relay. It is desired that the magnitude of the developed signal IZ of the transactor remain a substantially constant quantity in order that the reach quantity of the relay may remain a substantially constant quantity.

The phase angle between the signal coupled into the transactor and the signal output IZ, controlled by the transfer impedance Z having a transfer impedance angle $\theta$ of the transactor, is typically selected to correspond to the characteristic angle of the protective relay. The development of a characteristic angle employing a transactor has limitations with regard to its ability for changing or varying the characteristic angle without effecting the reach of the relay. For example, as the transfer impedance Z of the transactor is varied not only does the desired phase angle correspondingly vary, but also the magnitude of the output signal IZ from the transactor is varied, which causes the reach of the relay to vary also.

Variable gain operational amplifiers are commonly employed to compensate for voltage changes caused by changes in the transactor that would otherwise effect the reach of the relay. The variable gain operational amplifier may typically be coupled to the output of the transactor by a plurality of loading resistors. At least two resistors must be varied for each desired characteristic angle. If only two or possibly three different characteristic angles are desired to be selectable for a protective relay, this type of compensation serves its desired function. However, if a multiplicity of characteristic angles are desired, this type of compensation typically necessitates a large number of resistors, which, in turn have a disadvantage with regard to equipment mounting, more particularly, with regard to circuit board mounting. It is desirable that means be provided for adjusting or preselecting a plurality of characteristic angles that utilizes a substantially reduced number of resistors for its implementation.

The characteristic angle of the protective relay may be developed by means other than a transactor. For example, the protective relay may develop two types of signals: (1) an operate signal $V_{OP}$ and (2) a polarizing signal $V_{POL}$, by an appropriate phase shifting network. The previously mentioned U.S. patent application, Ser. No. 309,549, describes such $V_{OP}$ and $V_{POL}$ signals. The characteristic angle may be developed by phase shifting the $V_{POL}$ signal with respect to the $V_{OP}$ signal. This method also results in the reach of the relay being a function of the characteristic angle. That is, the reach of the relay is typically proportional to the reciprocal of the cosine of the phase shift angle. As the phase shift is altered, the reach of the relay is also altered. This method of phase shifting distorts the desired shape of the desired relay characteristic. For example, the $V_{OP}$ and $V_{POL}$ are typically applied to a coincidence circuit, that is, an "AND" circuit, whose output is routed to a timer circuit. The timer is typically set to develop an output signal when the coincidence angle between $V_{OP}$ and $V_{POL}$ equals 90° which produces a circular relay characteristic. The variation of this coincidence angle can produce other shapes for the relay characteristic which are desirable for some applications. For example, if the coincidence angle is selected to correspond to a value of greater than 90°, a "lens" shape for the characteristic of the relay is developed. Further, if the coincidence angle is selected to correspond to a value of less than 90°, a "tomato" shape for the characteristic of the relay is developed. This method of phase shifting the polarizing signal distorts the desired lens or tomato shapes of the relay characteristic.

Accordingly, objects of the present invention are, (1) providing means for accurately selecting a plurality of characteristic angles for a protective relay using a reduced number of resistors, and (2) providing a protective relay with a variable characteristic angle while maintaining (a) a desired shape for the relay characteristic and, (b) a substantially constant reach function.

These and other objects of the invention will become apparent to those skilled in the art upon consideration of the following description of the invention.

SUMMARY OF THE INVENTION

This invention is directed to a protective relay having means for selecting a plurality of characteristic angles while maintaining the reach function of the protective relay at a substantially constant magnitude. The means for selecting is adapted to be coupled to a transmission line by one or more transactors and a clamping means. The one or more transactors are respectively coupled to one or more phases of the transmission line by current coupling means and each current coupling means develops an output signal respectively representative of the current flowing within the coupled phase of the transmission line. Each of the one or more transactors has a primary winding connected to the coupling means, a secondary winding, a predetermined turns ratio between the secondary windings, and a loading resistor coupled across the secondary winding. The turns ratio and the loading resistor are chosen so as to develop a first output signal across the loading resistor upon which the reach function of the protective relay depends. The clamping means is interposed between each of the one or more transactors and the means for selecting. Each of the clamping means develops a second output signal. Each of the clamping means limits the first output signal to within a predetermined range of voltages. The means for selecting a plurality of characteristic angles comprises a differential means, selectable means, a capacitor and a plurality of resistors. The differential means comprises an inverting input, a non-inverting input, an output, and means for developing at the output a signal proportional to the difference between the signals applied to the inputs. A resistor R1 couples the inverting input to the output of the differential means. A resistor R2 couples the second output signal to the inverting input. A resistor R3 couples the second output signal to the non-inverting input. Means are provided for coupling the non-inverting input to one side of each of the plurality of resistors and also provided are means for coupling the one side of the resistors to one side of the capacitor. The selectable means has an arm. The arm has a first end coupled to the second output signal and a second end selectably connected to the other side of each of the plurality of resistors. The capacitor has a second side coupled to one side of the secondary winding of each of the one or more transactors. The plurality of resistors and the capacitor have values selected in combination with the predetermined turns ratio and loading resistor of each of the transactors so as to establish a predetermined time constant for each of the plurality of resistors. Each of the predetermined time constants are selected to establish the desired characteristic angle of the protective relay. Each of the predetermined time constants causes the second output signal applied to the non-inverting input to be phase shifted relative to the second output signal applied to the inverting input so as to cause the differential means to develop an output representative of its phase shifted inputs. Each of the predetermined time constants are selected to cause the output signal of the differential means to have a phase shift value relative to the input of the associated transactor which is the characteristic angle of the protective relay. The developed output signal provides the characteristic angle for the protective relay and has a magnitude which remains substantially constant for each of the plurality of resistors coupled to the differential means by the selectable means.

The features of the invention believed to be novel are set forth with particularity in the appended claims. The invention, itself, however, both as to its organization and operation, together with further objects and advantages thereof, may best be understood by reference to the following description taken in conjunction with the accompanying drawings.

DESCRIPTION OF THE DRAWINGS

The single FIGURE is a circuit diagram exemplifying one embodiment of the present invention.

DETAILED DESCRIPTION OF THE PREFERRED EMBODIMENT

The drawing shows a circuit arrangement 10 in accordance with one embodiment of the present invention. The circuit arrangement 10 shows a plurality of elements having the reference numbers and which are of the type or having values given in Table 1.

TABLE 1

| Elements | General Description |
|---|---|
| 11, 21, 31 | Conventional current transformers, each providing means for sensing current flowing within their respective phase of the transmission line 13. |
| 12, 22, 32 and 42 | Conventional transactors for coupling to current |

TABLE 1-continued

| Elements | General Description |
|---|---|
| | transformers 11, 21, and 31. |
| 20 and 30 | Operational amplifiers of the type LM224, available from National Semiconductor Corp., of Santa Clara, California. |
| 16 | A (9) position three-gang rotary switch of the type 31-X30M-12-J, available from RCL Electronics Division of AMF, Inc., Manchester, N.H. |
| CR1 and CR2 | Diodes of the type IN4148. |
| *R1 | 100K ohms |
| *R2 | 10K ohms |
| *R3 | 33.2K ohms |
| *R4 | 249K ohms |
| *R5 | 107K ohms |
| *R6 | 61.9K ohms |
| *R7 | 38.3K ohms |
| *R8 | 24.3K ohms |
| *R9 | 15.4K ohms |
| *R10 | 8.87K ohms |
| *R11 | 3.92K ohms |
| *R12 | 100K ohms |
| R13 | 75 ohms |
| C1 | .033 MFD ± 1% |

*precision resistors of the ± 1% type.

The drawing shows the windings of current transformers 11, 21, and 31 respectively coupled to phases A, B, and C of the transmission line 13. The current transformers 11, 21, and 31 respectively develop signals $I_A$, $I_B$, and $I_C$ each respectively representative of the current flowing within phases A, B, and C of the transmission line 13. The signals $I_A$, $I_B$, and $I_C$ are routed respectively to a first side of the primary winding of transactors 12, 22 and 32. One side of the secondary winding of each current transformer 11, 21 and 31 is coupled to one side of the primary winding of the transactor 42 and the other side of the primary winding of transactor 42 is connected to the second end of the primary winding of transactors 12, 22 and 32 so as to develop the signal $3I_0$ across the primary winding of transactor 42. Signal $3I_0$ is representative of the zero sequence component of the current flowing within the three (3) phase transmission line 13.

Transactors 12, 22, 32 and 42 are known devices having electrical characteristics similar in some respects to a conventional transformer and similar in other respects to a reactor. In effect, the transactor is an air-gap reactor having associated therewith primary and secondary windings, with a load circuit, such as R13 of transactor 12, connected to the secondary winding.

The voltage developed across the secondary winding of each transactor is accurately representative in magnitude of the net primary current energizing it. Secondary voltage is related to the primary current by a complex proportionality constant or vector operator known as the transfer impedance of the transactor. The transfer impedance, and hence the absolute magnitude of the secondary voltage and the specific angle by which this voltage leads the net primary current, can be controlled by varying the amount of load in the secondary circuit. The dimensions of the air gap in the transactor core and the selection of its turns ratio also affect the magnitude of the secondary voltage relative to the primary current. Open circuit secondary voltage leads primary current by nearly 90 electrical degrees, and as the resistive load value is decreased across the secondary winding, the angle of lead becomes less.

The turns ratio of each of the transactors 12, 22, 32, and 42, and the resistive values of their respective loading resistors R13, R23, R33, and R43, are selected so as to transform the respective input signals $I_A$, $I_B$, $I_C$ and $3I_0$ to output quantities from the transactors 12, 22, 32 and 42 equal to $IAZR1$, $IBZR1$, $ICZR1$ and $3I0ZR0$, respectively, which are further routed to circuits (not shown) to develop the operate signals for the relay, such as $IAZR1-IBZR1$, and the reach quantity for the relay, all of which are discussed in the "Background" section.

One side of the secondary winding of each of the transactors 12, 22, 32 and 34 is connected to the protective relay power supply common 26. The parameter $Z_{R1}$ is the replica positive-sequence impedance of the transmission line 13, whereas, the quantity $Z_{R0}$ is the replica zero sequence impedance of the transmission line 13. The parameters $Z_{R1}$ and $Z_{R0}$ are vector quantities and have both a magnitude and a phase angle. These parameters $Z_{R1}$ and $Z_{R0}$ are chosen to match the parameters of the protective relay to the parameters of the system for which the relay protects.

The circuit arrangement 10 of the drawing is applicable to all the signals $IAZR1$, $IBZR1$, $ICZR1$ and $3I0ZR0$; however, for the sake of clarity, only the development of $IAZR1$ is fully shown. The description to be given hereinafter, for the signal $IAZR1$ is also applicable to signals $IBZR1$, $ICZR1$, and $3I0ZR0$. The specific details related to signals $IBZR1$, $ICZR1$ and $3I0ZR0$ are to be described hereinafter as needed.

The secondary winding of transactor 12 for the signal $IAZR1$ has a loading resistor R13 coupled across it. The secondary winding of transactor 12 has one side connected to the common 26 and also connected to one side of a first capacitor C1. The other side of the secondary winding is coupled to a non-inverting input of a differential means such as the operational amplifier 20 via the resistor R12.

Operational amplifier 20 has a second input, that being an inverting type directly connected to its output via a signal path 14. Signal path 14 is also connected to one side of an inverse parallel arrangement of diodes CR1 and CR2. The other side of diodes CR1 and CR2 are connected to the non-inverting input of operational amplifier 20. The anodes and cathodes of diodes CR1 and CR2 are connected so as to allow bilateral conduction between the output and non-inverting input both of operational amplifier 20. The function of the diodes CR1 and CR2 is that when the amplitude of the signal $IAZR1$ exceeds the saturated output voltage of the operational amplifier 20, the $IAZR1$ signal is conducted via one of the diodes to the signal path 14, thus providing a path to bypass the operational amplifier 20. The diodes CR1 and CR2 clamp the signal $IAZR1$ to the value of the saturated output of the operational amplifier 20 which is slightly less than the value of the power supply voltages coupled to the operational amplifier 20. The operational amplifier 20 in combination with resistor R12 and diodes CR1 and CR2 provide means for clamping the signal $IAZR1$ to the predetermined range of power supply voltages.

The signal path 14 connected to the output of operational amplifier 20 is routed to (1) an inverting input of a differential means such as the operational amplifier 30 via resistor R2; (2) a non-inverting input of the operational amplifier 30 via resistor R3, and (3) to a common arm 22 of the switch 16. The inverting input of the operational amplifier 30 is connected to the output of the operational amplifier 30 via the resistor R1. The non-inverting input of operational amplifier 30 is connected to one side of a plurality of resistors R4, R5, R6, R7, R8, R9, R10 and R11 and also to one side of the first capacitor C1. The operational amplifier 30 provides the means for developing, at the output of the operational amplifier, a signal proporational to the difference between the signals applied to its inverting and non-inverting inputs.

The other end of each of the plurality of resistors is selectably connected to signal path 14 via the common arm 22 of the ganged rotary switch 16. The common arm 22 of switch 16 is mechanically connected, shown by arrow 18, to a second and a third plurality of resistors respectively related to signals IBZR1 and ICZR1.

The common arm 22 of rotary switch 16 is selectably positioned to positions 2, 3, 4, 5, 6, 7, 8 and 9, each of which is respectively connected to the other side of resistors R4, R5, R6, R7, R8, R9, R10 and R11.

The selection of the rotary switch 16 to a first or OFF position provides an input phase shifting network to the non-inverting input of amplifier 30 having a predetermined time constant determined by the values of the parallel arrangement of R3 and C1.

The selection of the rotary switch 16 to positions 2-9 alters the input phase shifting network to predetermined time constants respectively determined by the values of the selectable resistors R4, R5, R6, R7, R8, R9, R10 and R11 and the value of the first capacitor $C_1$ arranged in parallel with the resistor R3. The resistors R2 and R1 are selected to establish the gain of the operational amplifier.

Each of the predetermined time constants cause the output signal of operational amplifier 30 present on signal path 32 to be phase shifted relative to the signal IAZR1 which is the secondary voltage of transactor 12. The amount or degree of the phase angle between the input signal $I_A$ applied to the transactor 12 and the output signal developed by the operational amplifier 30 present on signal path 32, is the characteristic angle of the protective relay discussed in the "Background" section.

The arrangement of the resistors R1 . . . R11, the capacitor C1, and the operational amplifier 30 is similar to the commonly known type "all pass filter". The "all pass filter" operates in a manner as described in the text book "APPLICATION OF OPERATIONAL AMPLIFIERS THIRD-GENERATION TECHNIQUES", paragraph 3.5, pages 102 and 103, by Jerald G. Graeme, as published by McGraw-Hill Book Company, and to which reference may be made for further details of the operation of the operational amplifier 30 having the arranged resistors R1 . . . R11 and capacitor C1. Although the circuit arrangement of FIG. 1 with regard to the operational amplifier 30 is similar to the well known "all pass filter", it is believed that its implementation has never been used to set the characteristic angle of a protective relay. It is further believed that the reason the "all pass filter" was never used for this purpose is due to the environment in which the protective relay must operate.

A protective relay is typically coupled by current transformers 11, 21, and 31 to a high voltage transmission line such as transmission line 13. The transmission line 13 typically is subjected to high voltage and current surges or transients, which, in turn, generate a relatively large step function type signal, which, in turn, may be coupled into the electronic circuitry, such as circuit arrangement 10, of a protective relay. It was initially believed that a coupled signal of this type would disrupt the operation of a sensitive type circuit such as the arrangement of the operational amplifier 30 shown in the drawing, which, in turn, would disrupt the operation of the protective relay. As is well known, the protective relay must be a highly secure device, that is, the relay must be secure against false operation. It was initially believed that the usage of the sensitive type circuit arrangement of the operational amplifier 30 shown in the drawing would reduce the security desired for the protective relay.

In accordance with this belief, I determined, by way of calculations, the output voltage that may be developed by a typical all pass filter network having an applied positive step function input voltage such as 10 volts. For this condition, my calculations revealed that the output of the all pass filter would instantaneously seek a negative value substantially equal to the magnitude of the input voltage, and then the output voltage would rise exponentially to a positive value substantially equal to the applied input voltage. My calculations for this condition discouraged further pursuit of the use of an all pass filter network for protective relay applications. I was mainly led to this conclusion because if a signal that would instantaneously seek a negative value were applied to the all pass filter, the all pass filter may produce an erroneous output signal that could cause a misoperation of the protective relay. However, deeper study of this matter led me to realize that transactors, such as transactors 12, 22, 32 or 42 of the drawing, would not develop a step function output signal.

This nonexpectant realization caused me to pursue the use of the all pass filter for a protective relay. Accordingly, I then calculated the output voltage of the transactor with a step type current input such as 50 amperes, applied to the transactors 12 . . . 42. My calculations revealed that the differentiating action of the transactor causes the transactor to generate a relatively narrow impulse type output signal, having a typical pulse width of 1.0 msec for a typical transactor angle of 85°, in response to the step of current. I further calculated the output voltage that may be developed by the all pass filter with an applied impulse type signal developed from the transactor. My calculations determined that the output signal that may be developed by the all pass filter with the applied impulse type signal from the transactor was much less onerous than I had previously envisioned. For example, the output signal was a relatively narrow impulse typical output signal, having a typical pulse width of 1 msec which has a very low probability for causing a misoperation of the protective relay considering that the all pass filter typically supplies an input signal to a coincidence type circuit having a typical response time between 4 to 5 msec.

In accordance with the hereinbefore described calculations and my nonexpectant realizations, I discovered that the arrangement of the present invention insulates the sensitive operation of the circuit arrangement of the operational amplifier 30 from transients that may occur within the transmission line 13.

Still further, the circuit arrangement 10 of FIG. 1 provides this variable characteristic angle without adjusting or altering the transfer impedance angle of the transactors 11, 22, 32 and 42. The transfer impedance angles of the transactors 11, 22, 32 and 42 remains a substantially constant value for each selectable value of the characteristic angle of the protective relay. As discussed in the "Background" section the output of the transactors, such as the respective operate signal components IAZR1, IBZR1, ICZR1 and 3I0ZR0 of transactors 11, 22, 32 and 42, also determine the reach quantity of the protective relay. As further discussed in the "Background" section, it is desirable that the reach quantity remain substantially constant. The circuit arrangement 10 provides all of these desired results. For example, the circuit arrangement 10 provides a variable characteristic angle having a range from 40° to 80° while maintaining the magnitude of the operate signal components and hence the reach of the relay within a few per cent of the ideal value.

It should now be appreciated that the circuit arrangement 10 having the selectable means 16 for selecting one of a plurality of resistors R4 . . . R11 each developing a predetermined time constant that causes the operational amplifier 30 to develop an output signal having a substantially constant magnitude and being representative of the desired characteristic angle selected by means 16 is provided by this invention for the protective relay. The desired characteristic angle is provided without substantially affecting the reach setting of the relay.

As previously mentioned, the circuit arrangement 10 is also applicable to coupled signals IBZR1, ICZR1 and 3I0ZR0. The circuit arrangement 10 operates in substantially the same manner as described for signal IAZR1 in its development of the characteristic angle related to coupled signals IBZR1, ICZR1 and 3I0ZR0.

For the circuit arrangement shown in the drawing, the resistive values of resistors R1 . . . R13 and the capacitor C1 given in Tables 1 and the selector switch 16 provides nine different characteristic angles for the protective relay. These angles are 80°, 75°, 70°, 65°, 60°, 55°, 50°, 45° and 40° corresponding respectively to the OFF position and positions 2 through 9. In operation, the switch position is chosen so as to match the characteristic angle to the impedance angle of the transmission line 13.

It should now be appreciated, that the present invention provides means for selecting a plurality of characteristic angles for a protective relay using a reduced number of resistors while providing the protective relay with a substantially constant reach quantity.

It should also be appreciated, that although the preferred embodiment of the present invention describes the clamping means comprising the resistor R12, operational amplifier 20 and diodes CR1 and CR2 as being interposed between the transactors 12, 22, 32, and 42, and operational amplifier 30, if the voltage environment conditions in which the circuit arrangement 10 operate permit the clamping means may be omitted from the circuit arrangement 10 of the drawing.

Further, if desired the transactors 12, 22, 32 and 42 and current transformers 11, 21, and 31 all shown in the drawing may be replaced with other type coupling means. It is only desired that the replacement means for coupling develop a signal, similar to IAZR1, that is representative of the current flowing in the transmission line, such as the current $I_A$ flowing in the phase A of transmission line 13. Also, the replacement coupler must have a differentiating type property which prevents developing a step function on its output.

While the invention has been particularly shown and described for reference to several preferred embodiments thereof, it will be understood by those skilled in the art that various changes in form and detail may be made therein without departing from the true spirit and scope of the invention as defined by the appended claims.

What I claim as new and desire to secure by Letters Patent of the United States is:

1. A protective relay having means for selecting a plurality of characteristic angles while maintaining the reach function of the protective relay at a substantially constant magnitude, said means for selecting being adapted to be coupled to a transmission line by one or more transactors and a clamping means, said one or more transactors being respectively coupled to one or more phases of the transmission line by current coupling means and each current coupling means developing a signal respectively representative of the current flowing within the coupled phase of said transmission line, each of said one or more transactors having a primary winding connected to said coupling means, a secondary winding, a predetermined turns ratio between said windings, and a loading resistor coupled across said secondary winding, the turns ratio and the loading resistor being chosen so as to develop a first output signal across said loading resistor upon which the reach function of the protective relay depends, said clamping means being interposed between each of the one or more transactors and said means for selecting, each of the clamping means developing a second output signal, each of said clamping means limiting said first output signal to within a predetermined range of voltages;

said means for selecting a plurality of characteristic angles comprising: a differential means, selectable means, a capacitor and a plurality of resistors;

said differential means comprising an inverting input, a non-inverting input, and output, and means for developing at said output a signal proportional to the difference between the signals applied to said inputs;

a resistor R1 coupling said inverting input to said output of the differential means, a resistor R2 coupling said second output signal to said inverting input, a resistor R3 coupling said second output signal to said non-inverting input, means for coupling said non-inverting input to one side of each of said plurality of resistors and means for coupling said one side of the resistors to one side of said capacitor;

said selectable means having an arm, said arm having a first end coupled to said second output signal and a second end selectably connected to the other side of each of said plurality of resistors;

said capacitor having a second side coupled to one side of the secondary of each of said one or more transactors;

said plurality of resistors and said capacitor having values selected in combination with the predetermined turns ratio and loading resistor of each of said transactors so as to establish a predetermined time constant for each of said plurality of resistors, each of said predetermined time constants being selected to establish the desired characteristic angle of said protective relay, each of said predetermined time constants causing said second output signal applied to said non-inverting input to be phase shifted relative to said second output signal applied to said inverting input so as to cause said differential means to develop an output representative of its phase shifted inputs, each of the predetermined time constants being selected to cause the output signal of the differential means to have a phase shift value relative to the input of the associated transactor which is the characteristic angle of the protective relay, said developed output signal providing said characteristic angle for said protective relay and having a magnitude which remains substantially constant for each of the plurality of resistors coupled to said differential means by said selectable means.

2. A protective relay having means for selecting a plurality of characteristic angles while maintaining the reach function of the protective relay at a substantially constant magnitude, said means for selecting being adapted to be coupled to a transmission line by one or more transactors, said one or more transactors being respectively coupled to one or more phases of the transmission line by current coupling means and each current coupling means developing a signal respectively representative of the current flowing within the coupled phase of said transmission line, each of said one or more transactors having a primary winding connected to said coupling means, a secondary winding, a predetermined turns ratio between said windings, and a loading resistor coupled across said secondary winding, the turns ratio and the loading resistor being chosen so as to develop a first output signal across said loading resistor upon which the reach function of the protective relay depends;

said means for selecting a plurality of characteristic angles comprising; a differential means, selectable means, a capacitor and a plurality of resistors;

said differential means comprising an inverting input, a non-inverting input, an output, and means for developing at said output a signal proportional to the difference between the signals applied to said inputs;

a resistor R1 coupling said inverting input to said output of the differential means, a resistor R2 coupling said first output signal to said inverting input, a resistor R3 coupling said first output signal to said non-inverting input, means for coupling said non-inverting input to one side of each of said plurality of resistors and means for coupling said one side of the resistors to one side of said capacitor;

said selectable means having an arm, said arm having a first end coupled to the said first output signal and a second end selectably connected to the other side of each of said plurality of resistors;

said capacitor having a second side coupled to one side of the secondary of each of said one or more transactors, said plurality of resistors and said capacitor having values selected in combination with the predetermined turns ratio and loading resistor of each of said transactors so as to establish a predetermined time constant for each of said plurality of resistors, each of said predetermined time constants being selected to establish the desired characteristic angle of said protective relay, each of said predetermined time constants causing said first output signal applied to said non-inverting input to be phase shifted relative to said first output signal applied to said inverting input so as to cause said differential means to develop an output representative of its phase shifted inputs, each of the predetermined time constants is selected to cause the output signal of the differential means to have a phase shift value relative to the input of the associated transactor which is the characteristic angle of the protective relay, said developed output signal providing said characteristic angle for said protective relay and having a magnitude which remains substantially constant for each of the plurality of resistors coupled to said differential means by said selectable means.

3. A protective relay having means for selecting a plurality of characteristic angles while maintaining the reach function of the protective relay at a substantially constant magnitude, said means for selecting being adapted to be coupled to a transmission line by coupling means and a clamping means, said coupling means being coupled to one or more phases of the transmission line so as to develop a signal respectively representative of the current flowing within the coupled phase of said transmission line, each of said one or more coupling means further having the means so as to develop a first output signal across said coupling means upon which the reach function of the protective relay depends; said clamping means being interposed between each of the one or more coupling means and said means for selecting, each of the clamping means developing a second output signal, each of said clamping means limiting said first output signal to within a predetermined range of voltages;

said means for selecting a plurality of characteristic angles comprising; a differential means, selectable means, a capacitor and a plurality of resistors;

said differential means comprising an inverting input, a non-inverting input, an output, and means for developing at said output a signal proportional to the difference between the signals applied to said inputs;

a resistor R1 coupling said inverting input to said output of the differential means, a resistor R2 coupling said second output signal to said inverting input, a resistor R3 coupling said second output signal to said non-inverting input, means for coupling said non-inverting input to one side of each of said plurality of resistors and means for coupling said one side of the resistors to one side of said capacitor, said selectable means having an arm, said arm having a first end coupled to said second output signal and a second end selectably connected to the other side of each of said plurality of resistors;

said capacitor having a second side coupled to one side of said one or more coupling means;

said plurality of resistors and said capacitor having values selected in combination with the means for developing said reach function of each of said coupling means so as to establish a predetermined time constant for each of said plurality of resistors, each of said predetermined time constants being selected to establish the desired characteristic angle of said protective relay, each of said predetermined time constants causing said second output signal applied to said non-inverting input to be phase shifted relative to said second output signal applied to said inverting input so as to cause said differential means to develop an output representative of its phase shifted inputs, each of the predetermined time constants being selected to cause the output signal of the differential means to have a phase shift valve relative to the input of the coupling means which is the characteristic angle of the protective relay, said developed output signal providing said characteristic angle for said protective relay and having a magnitude which remains substantially constant for each of the plurality of resistors coupled to said differential means by said selectable means.

4. A protective relay having means for selecting a plurality of characteristic angles, said means for selecting being adapted to be coupled to a transmission line by one or more coupling means, each of said one or more coupling means being respectively coupled to one or more phases of the transmission line so as to develop a signal respectively representative of the current flowing within the coupled phase of said transmission line, each of said one or more coupling means further having means so as to develop a first output signal upon which the reach function of the protective relay depends;

said means for selecting a plurality of characteristic angles comprising; a differential means, selectable means, a capacitor and a plurality of resistors;

said differential means comprising an inverting input, a non-inverting input, an output, and means for developing at said output a signal proportional to the difference between the signals applied to said inputs;

a resistor R1 coupling said inverting input to said output of the differential means, a resistor R2 coupling said first output signal to said inverting input, a resistor R3 coupling said first output signal to said non-inverting input, means for coupling said non-inverting input to one side of each of said plurality of resistors and means for coupling said one side of the resistors to one side of said capacitor, said selectable means having an arm, said arm having a first end coupled to said first output signal and a second end selectably connected to the other side of each of said plurality of resistors;

said capacitor having a second side coupled to one side of one or more coupling means;

said plurality of resistors and said capacitor having values selected in combination with the means for developing said reach function of each of said coupling means so as to establish a predetermined time constant for each of said plurality of resistors, each of said predetermined time constants being selected to establish the desired characteristic angle of said protective relay, each of said predetermined time constants causing said first output signal applied to said non-inverting input to be phase shifted relative to said first output signal applied to said inverting input so as to cause said differential means to develop an output representative of its phase shifted inputs, each of the predetermined time constants being selected to cause the output signal of the differential means to have a phase shift value relative to the input of the associated coupling means which is the characteristic angle of the protective relay, said developed output signal providing said characteristic angle for said protective relay and having a magnitude which remains substantially constant for each of the plurality of resistors coupled to said differential means by said selectable means.

* * * * *